United States Patent [19]
Imai et al.

[11] Patent Number: 5,567,493
[45] Date of Patent: Oct. 22, 1996

[54] DIE FOR EXTRUSION OF MULTI-HOLE TUBE AND MULTI-HOLE TUBE MADE WITH THE DIE

[75] Inventors: Toshihiro Imai, Nagoya; Tokuo Shirai, Aichi-ken; Ken Yamamoto, Obu; Shingoro Fukuoka, Tokyo, all of Japan

[73] Assignees: Nippondenso Co., Ltd., Kariya; Furukawa Electric Co., Ltd., Tokyo, both of Japan

[21] Appl. No.: 143,907

[22] Filed: Nov. 2, 1993

[30] Foreign Application Priority Data

Nov. 5, 1992 [JP] Japan ..................... 4-296167

[51] Int. Cl.⁶ ........................................ F28D 1/04
[52] U.S. Cl. .................... 428/36.9; 428/72; 428/116; 428/131; 428/178; 428/188; 428/304.4; 425/131.1; 425/132; 425/461; 425/462; 425/463; 425/464; 425/465; 425/466; 425/467; 425/67; 425/71; 425/72.1; 425/DIG. 217; 425/382 R; 425/381; 425/380
[58] Field of Search ..................... 428/72, 116, 131, 428/178, 188, 304.4, 36.9; 425/131.1, 132, 461, 462, 463, 464, 465, 466, 467, 67, 71, 72.1, DIG. 217, 382 R, 381, 380; 72/265; 165/151, 152; 138/115, 116, 117

[56] References Cited

U.S. PATENT DOCUMENTS

| | | | |
|---|---|---|---|
| 2,151,540 | 3/1939 | Varga | 138/117 |
| 3,905,743 | 9/1975 | Bagley | 425/131 |
| 4,313,327 | 2/1982 | O'Conner | 72/265 |
| 4,766,953 | 8/1988 | Grieb et al. | 138/117 |
| 4,852,233 | 8/1989 | Kawase | 29/157.4 |
| 4,892,143 | 1/1990 | Ishii | 165/152 |
| 5,186,250 | 2/1993 | Ouchi et al. | 165/177 |
| 5,202,547 | 4/1993 | Abe et al. | 219/552 |
| 5,202,548 | 4/1993 | Kondo et al. | 219/552 |
| 5,251,692 | 10/1993 | Haussmann | 165/152 |
| 5,254,840 | 10/1993 | Thompson | 219/544 |
| 5,316,997 | 5/1994 | Toyoda et al. | 502/314 |

FOREIGN PATENT DOCUMENTS

| | | | |
|---|---|---|---|
| 61-1994 | 1/1986 | Japan | 165/152 |
| 245729 | 12/1990 | Japan . | |
| 3102193 | 4/1991 | Japan | 165/152 |
| 3193209 | 8/1991 | Japan . | |
| 2095158 | 9/1982 | United Kingdom . | |

OTHER PUBLICATIONS

Patent Abstract of Japan, vol. 15, No. 452, (M-1180) Nov. 18, 1991, JP A 03 193 209 Furukawa Electric Co., Ltd.

*Primary Examiner*—William Watkins
*Attorney, Agent, or Firm*—Cushman, Darby & Cushman

[57] ABSTRACT

A multi-hole tube extrusion die comprises a female mold die having a flat opening and a mandrel having comb-teeth-like molding portions arranged in the opening. A heated material is extruded between the female mold die opening and the comb-teeth-like molding portions of the mandrel to form a tube having a multi-plicity of holes. An interval between each of the comb-teeth-like molding portions at the opposite ends of the mandrel and the comb-teeth-like molding portion adjacent to the outermost comb-teeth-like molding portion is set to be smaller than an intervals between the female mold die opening and each of the outermost comb-teeth-like molding portions and to be larger than an interval between adjacent ones of the other comb-teeth-like molding portions. Additionally, the outermost comb-teeth-like molding portions are larger in width than the other comb-teeth-like molding portions. Therefore, a lateral pressure difference acting on each of the outermost comb-teeth-like molding portions due to flows of the material is reduced, and the rigidity of outermost comb-teeth-like molding portions is increased, thereby preventing deformation of the die and enabling prolongation of the life of the die as well as a highly accurate extrusion.

8 Claims, 8 Drawing Sheets

DIE FOR EXTRUSION OF MULTI-HOLE TUBE AND MULTI-HOLE TUBE MADE WITH THE DIE

BACKGROUND OF THE INVENTION

The present invention relates to a multi-hole tube extrusion die and a multi-hole tube made with the multi-hole tube extrusion die.

A multi-hole tube is flat in cross section, has a multiplicity of holes extending in the longitudinal direction thereof and is used in an evaporator in an air conditioning system of an automobile, and the like. Such a multi-hole tube is disclosed, for example, in Japanese Utility Model Examined Publication No. 2-45729. The multi-hole tube disclosed in this publication has the holes each of which is gradually reduced in cross sectional area from the air intake side of the tube toward the air discharge side thereof to improve processability and strength. Further, the partition wall between adjacent holes is also formed such that it is gradually made slender from the air intake side toward the air discharge side.

Typically, the multi-hole tube is made by hot extrusion using a die (including a rotary wheel type continuous extrusion). Japanese Patent Unexamined Publication No. 3-193209 discloses an example of a multi-hole tube extrusion die. This publication discusses an inclination or approaching angle from the proximal end of the molding portion of a die toward the extreme end thereof to ensure good extrudability.

A typical example of a multi-hole tube extrusion die will be described with reference to FIGS. 10 and 11. The die is composed of a female die 1000 having a flat opening 1001 formed therethrough and a mandrel 1003. The mandrel 1003 has a multiplicity of comb-teeth-like molding portions (hereinafter, referred to as comb-teeth) 1002 which are arranged in a row widthwise in the opening 1001. A material to be processed, which has been heated into a hot state, is extruded through spaces between the opening 1001 and the comb-teeth 1002 to form a multi-hole tube. The flow of the material is indicated by the arrow of a solid line in FIG. 11.

In recent years, apparatuses such as a heat exchanger using multi-hole tubes is improved to be more efficient, and each multi-hole tube is required to be made small in size and have a still greater number of holes than those of a conventional multi-hole tube. A multi-hole tube for satisfying this requirement is constructed such that the width of each hole or flow path is narrow and a partition wall between adjacent holes is thinner than, for example, the outer peripheral wall of the multi-hole tube. Further, in a multi-hole tube extrusion die for use to this end, the comb-teeth 1002 have to be small in cross sectional shape to form a greater number of holes in the multi-hole tube, and the rigidity of the comb-teeth is lessened.

SUMMARY OF THE INVENTION

The present invention has an object of providing multi-hole tube extrusion die which can form a larger number of holes in a multi-hole tube with good accuracy and prevent the tool life from shortening.

Another object of the invention is to provide a multi-hole tube which has a larger number of holes while being capable of satisfying dimensions and accuracy required to a product.

To attain the above objects, the invention intends to suitably set intervals between comb-teeth of a multi-hole extrusion die to thereby reduce deformation thereof during extrusion, in view of a problem of the conventional art which has been illuminated by the present inventors and will be described later. Additionally, the invention intends to increase the rigidity of principal comb-teeth of the multi-hole tube extrusion die.

A multi-hole tube extrusion die according to the invention includes a female mold die having flat opening, and a mandle having a plurality of bar-shaped, comb-teeth-like molding portions formed in a row at intervals in a direction of width of the opening. The mandle is associated with the female mold die in a manner that the comb-teeth-like molding portions are positioned in the female mold die opening to define a space between the molding portions and the female mold die opening, through which space a material to be processed, heated into a hot state, is extruded to manufacture a multi-hole tube formed with a plurality of fluid paths corresponding to the plural comb-teeth-like molding portions and a plurality of partition walls corresponding to the intervals. The mandle is formed to satisfy at least one of the following conditions: (a) the intervals between adjacent comb-teeth-like molding portions corresponding to thicknesses of the partition walls for the fluid paths are varied in the width direction and, when the intervals of the comb-teeth-like molding portions are represented from respective ends in the width direction of the opening toward inside by $t_a, t_b, t_c, t_d, \ldots$, the intervals are in a relation of $t_a > t_b$; and (b) thicknesses of adjacent comb-teeth-like molding portions in the width direction, corresponding to widths of the fluid paths, are varied in the width direction and, when the thicknesses of the comb-teeth-like molding portions are represented from the respective ends in the width direction of the opening toward the inside by $w_a, w_b, w_c, w_d, w_e, \ldots$, the thicknesses are in a relation of $w_b > w_c$.

In the above extrusion die, the intervals between adjacent comb-like molding portions are varied with respect to at least parts thereof to thereby reduce a pressure difference in a material flowing along opposite sides of each comb-teeth-like molding portion. That is, a larger difference is not produced between the pressures of the material to be processed which are acting on the opposite sides of each comb-teeth-like molding portion, and a deformation of the comb-teeth-like molding portion, which would otherwise be caused when the material is extruded, is restrained. Further, the thickness of the outermost comb-teeth-like molding portions in the direction of the row of the comb-teeth-like molding portions, on which pressures larger than those on the other molding portions act, is increased to improve the rigidity of these molding portions and further restrain the deformation of the comb-teeth-like molding portions.

Further, a flat multi-hole tube according to the invention has a cross section which is formed by two side portions confronting each other, two connection portions respectively connecting the two side portions to each other at opposite ends thereof, and partition walls respectively interconnecting the two side portions to define therein spaces serving as a plurality of fluid paths. At least ones of thicknesses of adjacent partition walls and path widths of the fluid paths are varied in a direction of width of the multi-hole tube and are set to satisfy at least one of the following conditions: (a) when the thicknesses of the partition walls are represented from respective ends thereof in the width direction toward inside by $t_a, t_b, t_c, t_d, \ldots$, the thicknesses are in a relation of $t_a > t_b$; and (b) when the path widths of the fluid paths are represented from respective ends thereof in the width direction toward inside by $w_a, w_b, w_c, w_d, w_e, \ldots$, the path widths are in a relation of $w_b > w_c$.

BRIEF DESCRIPTION OF THE DRAWINGS

FIGS. 10, 11 12 and 13 show conventional arts for explaining the problem underlying the invention, wherein FIG. 10 is a fragmentary end view of a multi-hole tube extrusion die, FIG. 11 is a cross sectional view of an essential portion of the die shown in FIG. 10, FIG. 12 is an end view of the conventional flat tube, and FIG. 13 is a graph showing the distribution of thicknesses of partition walls in the flat tube of FIG. 12.

DESCRIPTION OF THE EMBODIMENTS

At the outset, in order to facilitate understanding of the present invention, the problem of the conventional art, which has been illuminated by the present inventors, will be described with reference to FIGS. 10 to 13.

Figure 11:
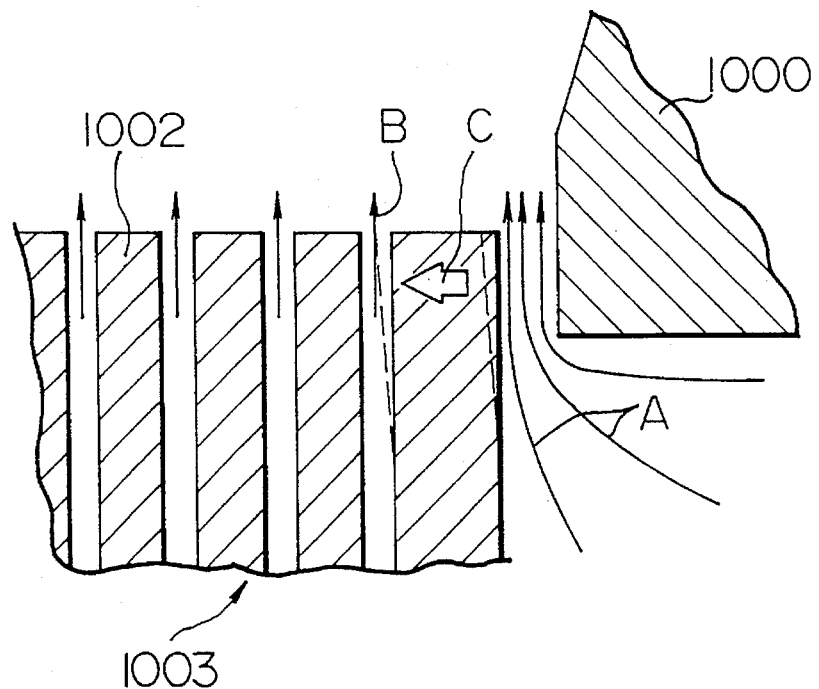

As described above, multi-hole tubes produced in recent years have the structures in which the width of each fluid path is narrow and a partition wall between adjacent fluid paths is thinner than an outer peripheral wall of the multi-hole tube. Therefore, when producing a multi-hole tube, as shown in FIG. 11, a flow A of a material for forming the outer peripheral wall is larger in amount than a flow B for forming each partition wall, because the opposite ends of the multi-hole tube are set to be particularly large in thickness, so that a difference is made between lateral pressures acting on the comb-teeth 1002 at the opposite ends of the tube, or pressures in the directions of a width of the multi-hole tube.

On the other hand, it is necessary for a multi-hole tube extrusion die to reduce the cross sectional areas of the comb-teeth 1002 to form as many holes as possible in the multi-hole tube, and rigidity decreases. Accordingly, the comb-teeth 1002 at the opposite ends, particularly their distal ends, are deformed inwardly due to the above pressure difference as shown by arrows C in FIGS. 10 and 11. As a result, a conventional multi-hole tube extrusion die is encountered with the problem that as the number of holes of a multi-hole tube is increased, the life of the comb-teeth 1002 is shortened. It is sufficiently supposed that this phenomenon occurs not only on the comb-teeth 1002 at the opposite ends but also to the other comb-teeth 1002 located inside the opposite end teeth.

When the above phenomenon occurs during the manufacture of multi-hole tubes, the life of the comb-teeth 1002 of the die is shortened and therefore a manufacturing cost is increased. Further, the multi-hole tubes formed with the die are not in a predetermined shape due to the deformation of the comb-teeth 1002, and they do not satisfy the accuracy required to products.

Figure 12:
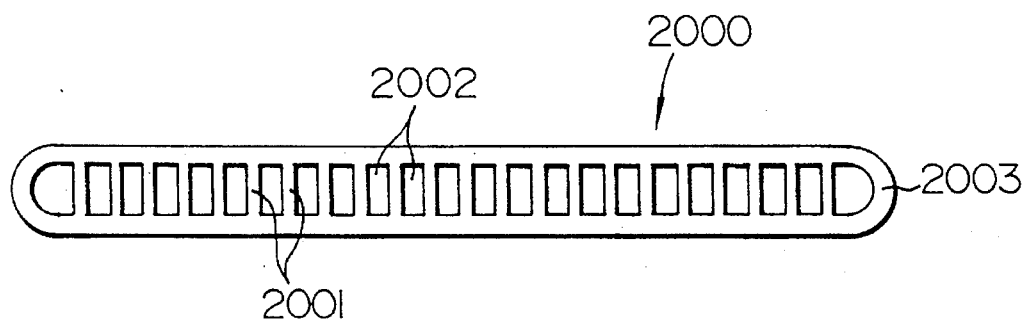
Figure 13:
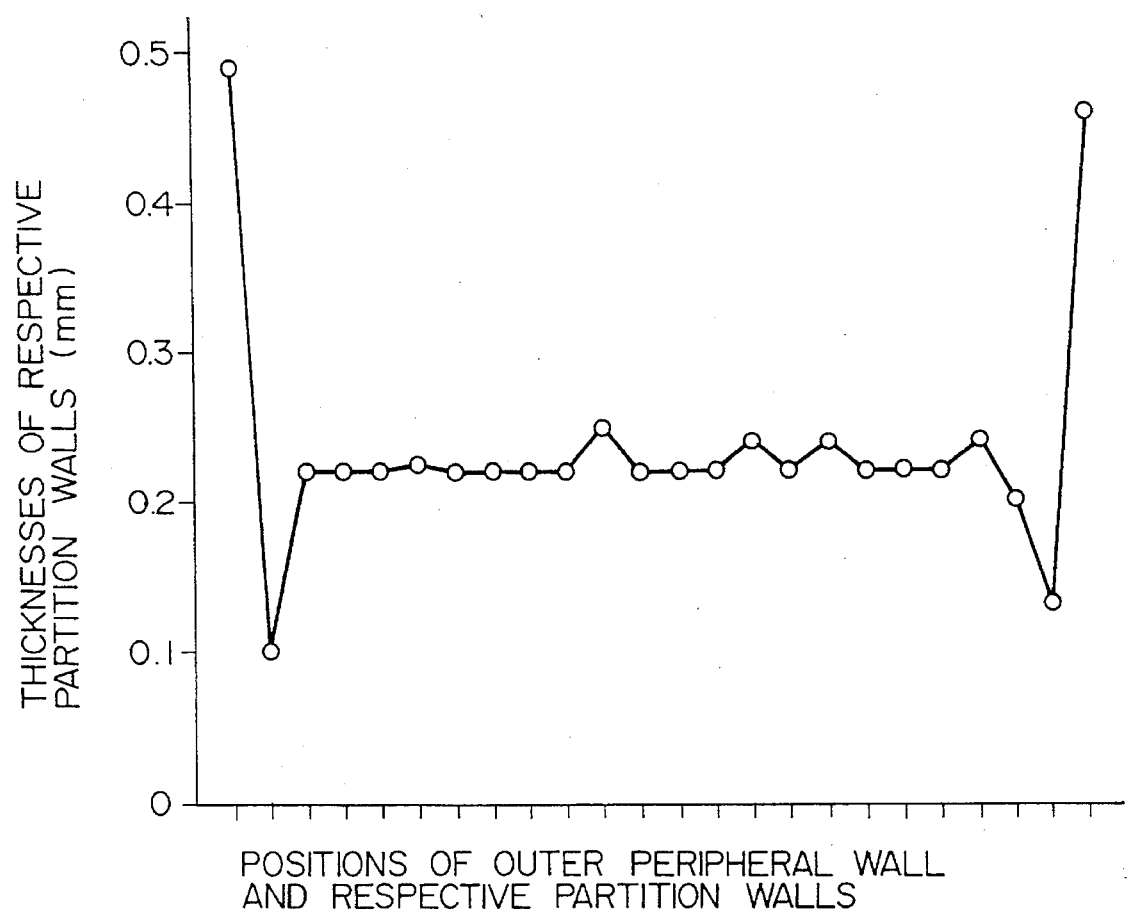

Subsequently, a case where a multi-hole tube does not satisfy the required accuracy is shown in FIGS. 12 and 13. The multi-hole tube 2000 of this example was made by a rotary wheel type continuous extruder so that partition walls 2001 and fluid paths 2002 had the same dimensions, respectively, with the thickness of each partition wall set to 0.2 mm and the width of each fluid path set to 0.45 mm. FIG. 13 shows the result of measurement of the thicknesses of the respective partition walls of the multi-hole tube 2000 thus formed. It is appreciated from the figure that the partition walls 2001 on the opposite sides are thinner and an outer peripheral wall 2003 is thick. It can be easily understood also from the result that comb-teeth 1002 on the opposite ends are deformed inwardly when a material is extruded.

The invention has been achieved in view of the above problem of the conventional art.

A multi-hole tube extrusion die according to an embodiment of the invention and a multi-hole tube produced with this die will be now described with reference to FIGS. 1 to 5.

Figure 1:
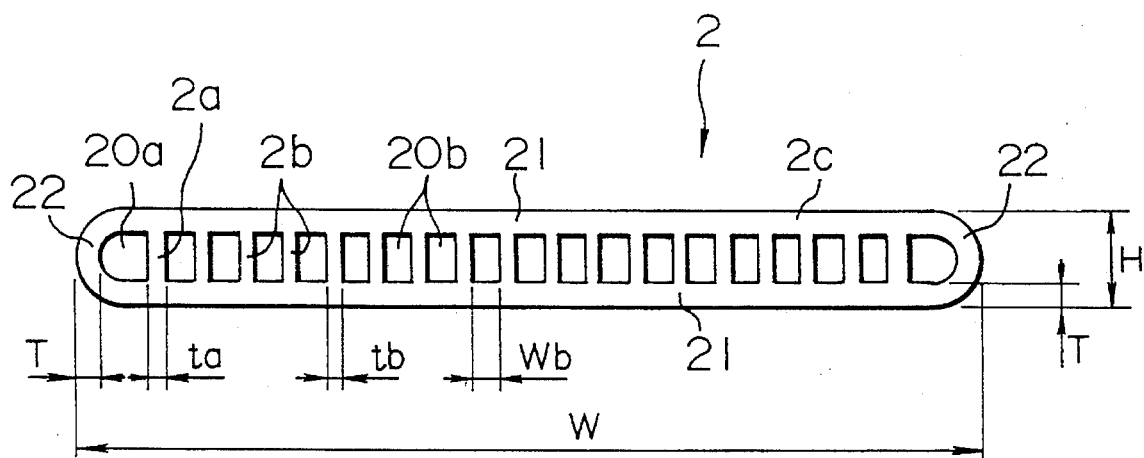
FIG. 1 is an end view of a flat multi-hole pipe or tube according to an embodiment of the present invention.
Figure 2:
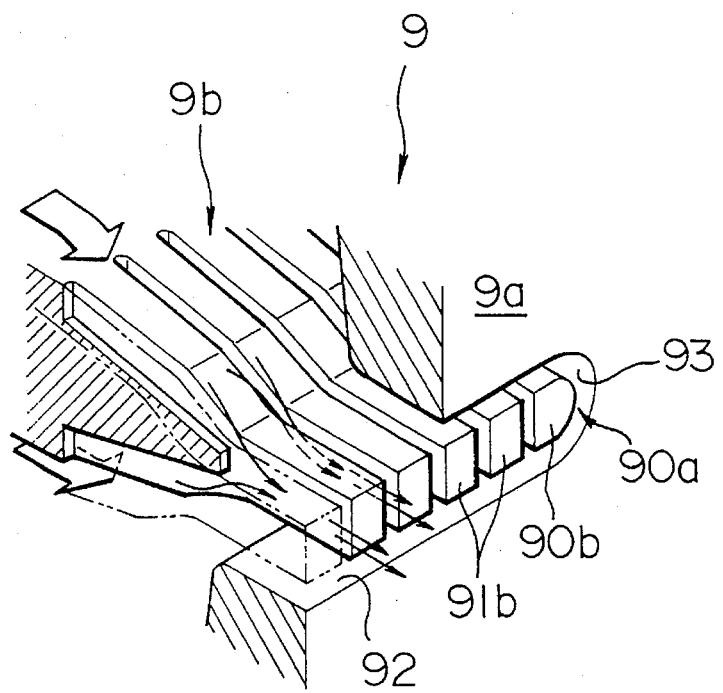
FIG. 2 is a perspective view of an essential portion of an extrusion die for forming the flat tube of FIG. 1.

FIG. 1 shows an end of the multi-hole tube which is used as a flat tube in a refrigerant condenser, and FIG. 2 shows an essential portion of the multi-hole tube extrusion die.

Figure 4:
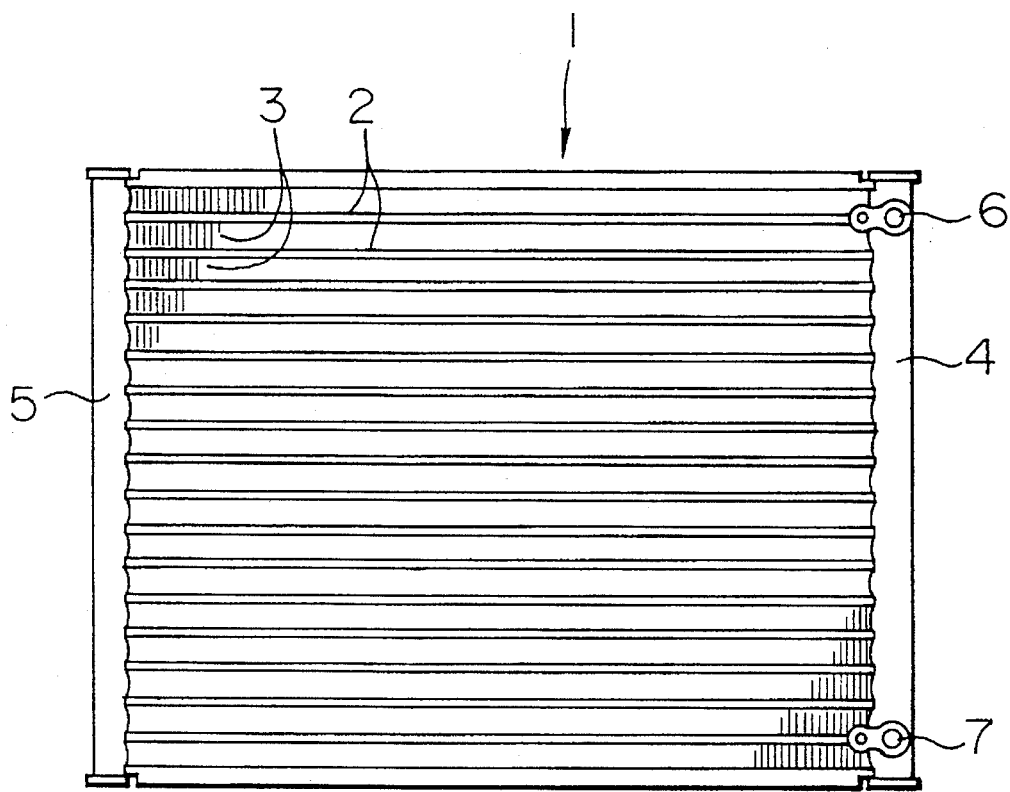
FIG. 4 is a front view of a refrigerant condenser in which the flat tube of FIG. 1 is incorporated.

The refrigerant condenser 1, as shown in FIG. 4 which is the front view of the refrigerant condenser 1, has a heat exchange unit composed of a multiplicity of the flat tubes 2 and corrugated fine 3, which are stacked up one after the other. A pair of headers 4, 5, an inlet pipe 6 for introducing refrigerant and an outlet pipe 7 for discharging the refrigerant are disposed on the opposite sides of the heat exchange unit, respectively. The refrigerant condenser 1 is made with these components fixed to each other into one united body by brazing.

As shown in FIG. 1, the flat tube 2 includes an outer peripheral wall 2c of a flat cross section, which is composed of two parallel portions 21 confronting each other and curved portions 22 for connecting these parallel portions at the opposite end thereof, respectively. A plurality of partition walls 2a, 2b are formed inside the outer peripheral wall 2c to extend in the longitudinal direction of the tube 2. The partition walls 2a, 2b define a multiplicity of refrigerant paths 20a, 20b, 19 pieces of refrigerant paths in this embodiment, which are arranged in the direction of flatness of the outer peripheral wall 2c (the horizontal direction in FIG. 1). The flat tube 2 is an extruded product of aluminum and is made with the multi-hole tube extrusion die 9 which will be described later.

In the flat tube 2, the outermost refrigerant paths 20a are set to be larger in their width in the direction of flatness of the outer peripheral wall than the other refrigerant paths 20b, and the thickness of the partition walls 2a at opposite ends is set to be larger than that of the other partition walls 2b. Dimensions required to the flat tube 2 of this embodiment are as follows: entire width W: 16 mm, height H: 1.7 mm, thickness T of the outer peripheral wall 2c: 0.4 mm, path width wb of each refrigerant path 20b: 0.55 mm, thickness ta of the partition walls 2a at the opposite ends: 0.3 mm, and thickness tb of the other partition walls 2b: 0.2 mm.

As shown in FIG. 2, the multi-hole tube extrusion die 9 includes a female mole die 9a having a flat, elongated-circular opening 90a and a mandrel 9b associated with the die 9a. The opening 90a of the die is defined, correspondingly to the flat tube 2, by two parallel portions 92 confronting each other and curved portions 93 connecting the parallel portions at the opposite ends thereof, respectively. The mandrel 9b has a multiplicity of comb-teeth 90b, 91b, 19 pieces of comb-teeth 90b, 91b in this embodiment, which are a multiplicity of bar-shaped members arranged in a row at intervals from one another. The mandrel 9b is fixed to the female mold die 9a with the comb-teeth 90b, 91b inserted into the opening 90a. In this state, the comb-teeth 90b, 91b are substantially parallel with the parallel portions of the opening 90a with a space left between the inner periphery of the opening and the comb-teeth.

Figure 3:
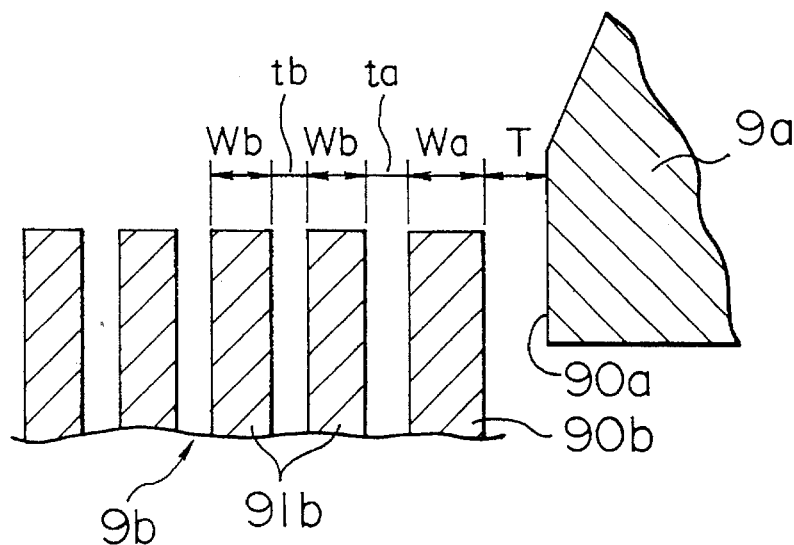
FIG. 3 is a cross sectional view of the essential portion of the die shown in FIG. 2.

In the die 3 of this embodiment, as shown in FIG. 3, the comb-teeth 90b at the opposite ends of the mandrel 9b are set to have the thickness wa in the width direction or the direction of the row of the comb-teeth, which is larger than that of the other comb-teeth 91b which is the same as the width wb (=0.55 mm) of the flow paths of the flat tube 2. Further, the second interval ta between each of the comb-teeth 90b at the opposite ends and the comb-tooth 91b located inside the outermost comb-tooth 90b is set to be larger than the third interval tb between adjacent ones of the comb-teeth 91b. The second interval ta corresponds to the thickness ta (=0.3 mm) of the partition walls 2a at the opposite ends of the flat tube 2, and the third interval corresponds to the thickness tb (=0.2 mm) of the other partition walls 2b of the flat tube 2. Further, the second interval ta is set to be smaller than the first interval T between each of the comb-teeth 90b at the opposite ends and the inner periphery of the die opening 90a, which corresponds to the thickness T of the outer peripheral wall 2c of the flat tube 2.

When the flat tube 2 is made with the die 9, an aluminum material heated into a hot state is put under pressure into the die from the rear side of the mandrel 9b, and it is divided into two layers once behind the respective comb-teeth 90b, 91b. The material divided into the two layers passes through the space between the opening 90a of the die and the mandrel 9b and spaces between the comb-teeth 90b, 91b, while being jointed again in the vicinity thereof, to form the outer peripheral wall 2c and the respective partition walls 2a, 2b of the flat tube 2. The flows of the aluminum material are indicated by arrows in FIG. 2.

Figure 5:
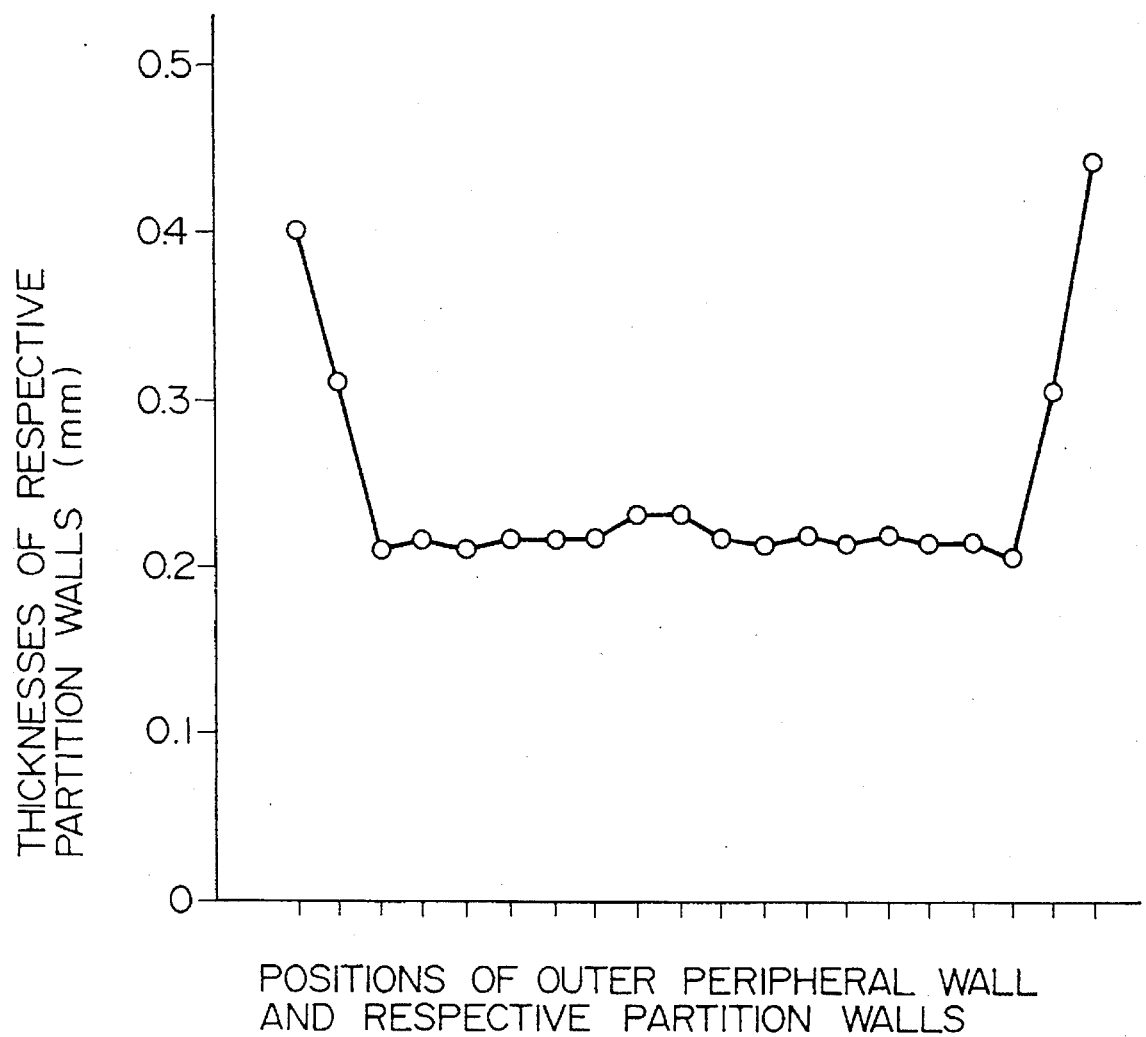
FIG. 5 is a graph showing the distribution of thicknesses of partition walls in the flat tube of FIG. 1.

FIG. 5 shows the result of measurement of the thicknesses of the respective partition walls of the flat tube 2 extruded with the die 9. As shown in the thickness distribution graph of FIG. 5, formed in this flat tube 2 are the partition walls 2a, 2b which can substantially meet the required dimensions (the thickness of the partition walls at the opposite ends: 0.3 mm, the thickness of the other partition walls: 0.2 mm).

Accordingly, it is understood that in the die of this embodiment, each of the comb-teeth 90b, 91b has sufficient rigidity against the aluminum material passing along the opposite sides of the comb-tooth 90b or 91b, and the comb-teeth 90b at the opposite ends are not deformed inwardly. This is because that in the die of this embodiment, the thickness wa of the comb-teeth 90b located at the opposite ends of the mandrel 9b is set to be larger than the thickness wb of the other comb-teeth 91b and the interval ta between each of the comb-teeth 90b at the opposite ends and the comb-tooth 91b located inside the comb-tooth 90b is set to be larger than the interval tb between adjacent ones of the comb-teeth 91b. As a result, the rigidity of the comb-teeth 90b at the opposite ends is improved, and further, a large difference is not produced between the flow pressures exerted on the opposite sides of each of the comb-teeth 90b so that the comb-teeth 90b at the opposite ends are prevented from deforming.

Subsequently, a multi-hole tube extrusion die according to another embodiment of the invention and a multi-hole tube made with this die will be described with reference to FIG. 6 to FIG. 8.

Figure 6:
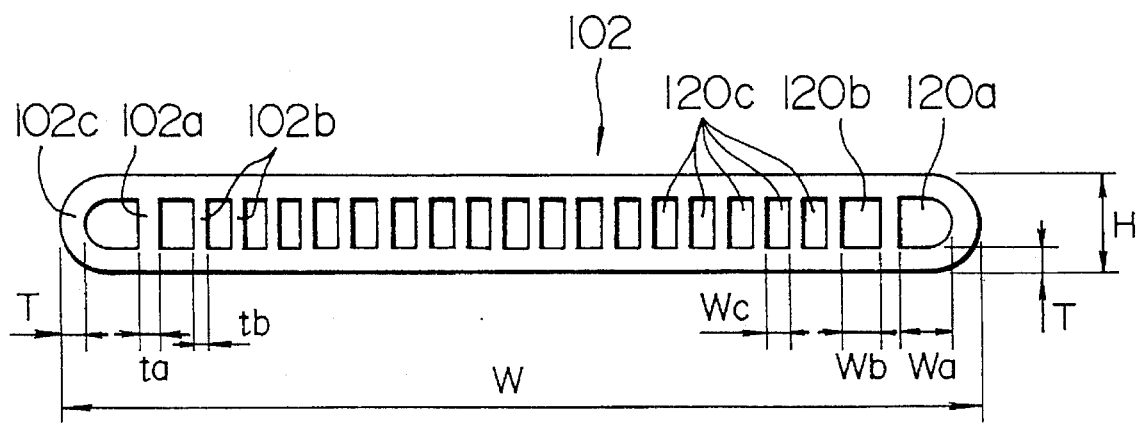
FIG. 6 is an end view of a flat multi-hole tube according to a second embodiment of the invention.

FIG. 6 shows an end of the flat tube 102 which is essentially identical in structure with the above-described embodiment but has a larger number of flow paths. More specifically, 21 pieces of refrigerant paths 120a, 120b, 120c are provided from the opposite ends of the flat tube 102 toward the inner side thereof. In this flat tube 102, similarly to the above-described embodiment, the width of the refrigerant paths 120a at the opposite ends is set to be larger than that of the other refrigerant paths 120b, 120c, and the thickness of partition walls 102a at the opposite ends is set to be larger than that of other partition walls 102b. Further, there is a fear that comb-teeth 190b, 191b, 192b (see FIG. 7) of the die will be deformed due to the formation of holes more than those of the above-described flat tube 2. For this reason, in the flat tube 102 of this embodiment, the two refrigerant paths 120b adjacent to the respective refrigerant paths 120a at the opposite ends are set to be larger in width than the refrigerant paths 120c located further inside.

Dimensions required to the flat tube 102 of this embodiment are as follows: entire width W: 16 mm, height H: 1.7 mm, thickness T of an outer peripheral wall 102c: 0.4 mm, path width wb of each refrigerant path 120b adjacent to each of the refrigerant paths at the opposite ends: 0.65 mm, path width wc of the refrigerant paths 120c located inside the refrigerant paths 120b: 0.45 mm, thickness ta of the partition walls 102a at the opposite ends: 0.3 mm, and thickness tb of the other partition walls 102b: 0.2 mm.

Although the multi-hole extrusion die 109 of this embodiment is essentially identical in structure with the die of the above-described embodiment, dimensions of respective parts are different to a certain degree from those of the above-described embodiment in accordance with the dimensions set to the flat tube 102.

Figure 7:
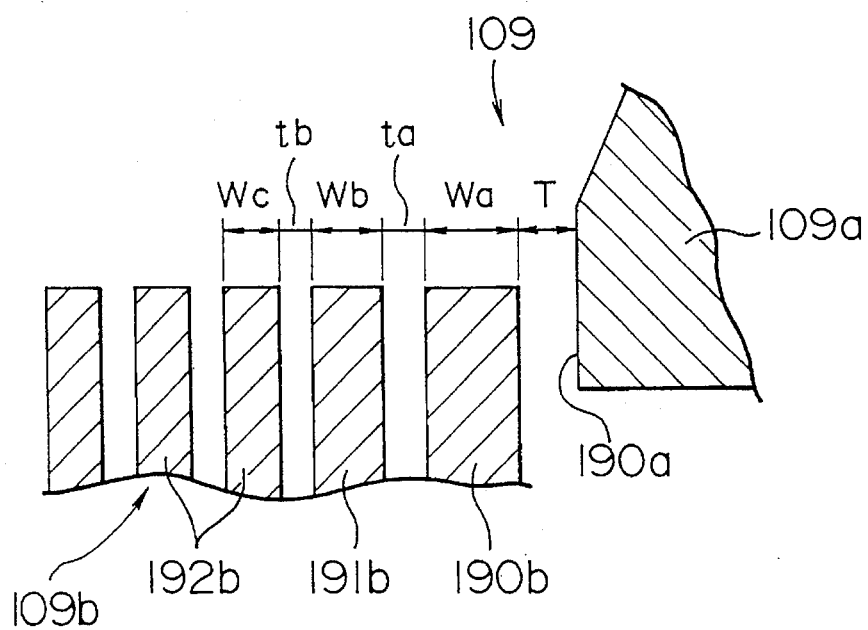
FIG. 7 is a cross sectional view of an essential portion of an extrusion die for forming the flat tube of FIG. 1.

More specifically, as shown in FIG. 7, the comb-teeth 190b located at the opposite ends of a mandrel 109b is set to have a thickness wa in the width direction or the direction of a row of the bomb-teeth, which is larger than that of the other comb-teeth 191b, 192b. The thickness of the two comb-teeth 191b adjacent to the respective comb-teeth 190b at the opposite ends is set to be larger than that of the comb-teeth 192b located further inside. The former thickness corresponds to the width wb (=0.65 mm) of the fluid paths 120b of the flat tube, and the latter thickness corresponds to the width wc (=0.45 mm) of the fluid paths 120c of the flat tube. Further, the second interval ta between each of the comb-teeth 190b at the opposite ends and the comb-tooth 191b adjacent the outermost comb-tooth 190b is set to be larger than the third interval tb between adjacent ones of the comb-teeth 191b, 192b. The second interval ta corresponds to the thickness ta (=0.3 mm) of the partition walls 102a at the opposite ends of the flat tube, and the third interval tb corresponds to the thickness tb (=0.2 mm) of the other partition walls 102b of the flat tube. Further, the second interval ta is set to be smaller than the first interval T between each of the comb-teeth 190b at the opposite ends and an opening 190a of a female mold die 109a, which corresponds to the thickness T of the outer peripheral wall 102c of the flat tube.

Figure 8:
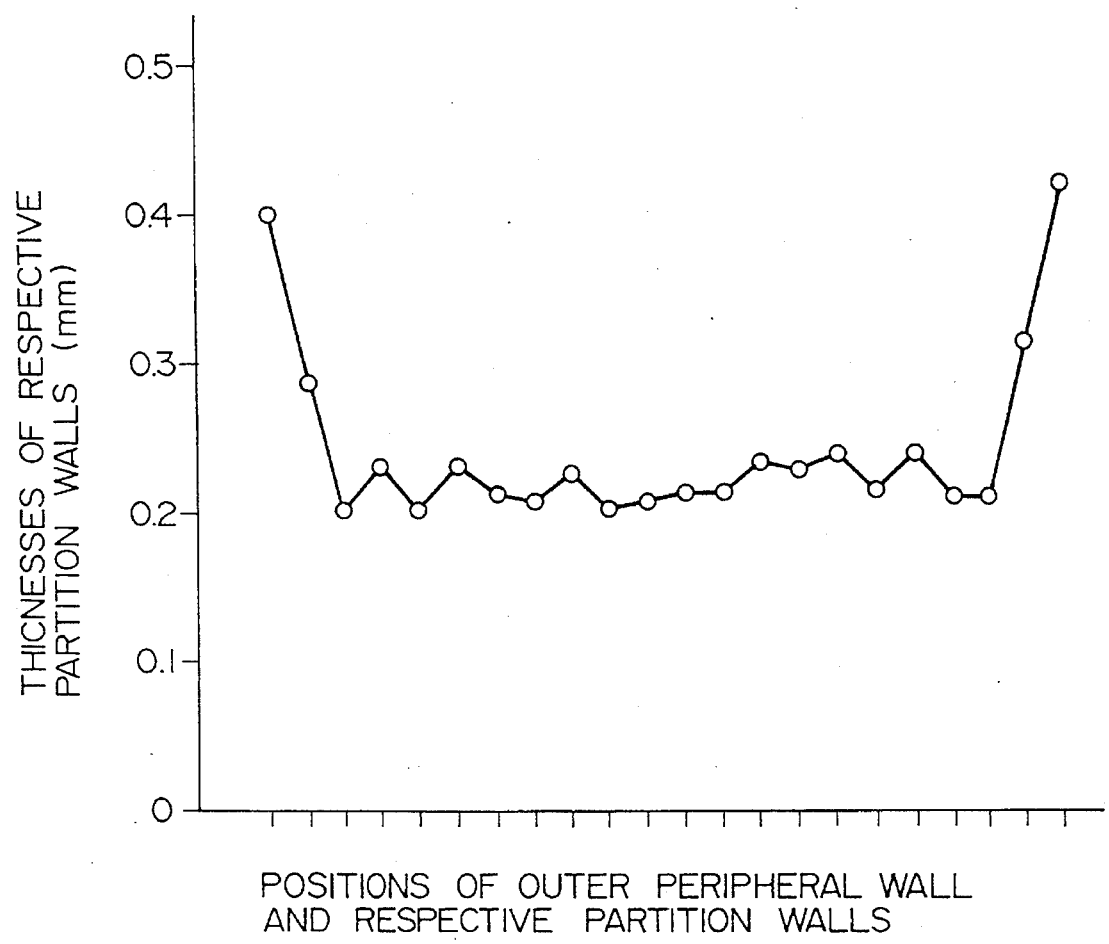
FIG. 8 is a graph showing the distribution of thicknesses of partition walls in the flat tube of FIG. 6.

FIG. 8 shows the result of measurement of the thicknesses of the respective partition walls of the flat tube 102 extruded with the die 109. As shown in the thickness distribution graph of FIG. 8, the partition walls 102a, 102b which substantially satisfy the required dimensions (thickness of the partition walls at the opposite ends: 0.3 mm, and thickness of the other partition walls: 0.2 mm) can be obtained in this flat tube 102.

In the die of this embodiment, the thickness of the comb-teeth at the opposite end portions of the mandral, i.e., the thickness of the comb-teeth 190b at the opposite ends and the thickness of the comb-teeth 191b adjacent to the outermost comb-teeth 190b are made large so that the rigidity of these comb-teeth is increased in order to form the holes more than those of the above-described embodiment in the flat tube 102. Further, the intervals between the comb-teeth 190b, 191b, 192b at the opposite end portions of the mandrel are gradually reduced from the opposite ends of the row of the comb-teeth toward the width wise center thereof, or toward the inside to reduce a lateral pressure difference caused between the opposite sides of each of these comb-teeth by the flows of a material. As a result, it is possible to prevent the comb-teeth 190b, 191b, 192b from deforming to provide the flat tube 102 which substantially satisfy the required dimensions.

As described above, according to the invention, even when extruding a multi-hole tube having a multiplicity of holes, the life of a die can be prolonged owing to the improved rigidity of the comb-teeth, and a multi-hole tube satisfying required dimensions and accuracy can be provided owing to the prevention of deformation of the comb-teeth. It is preferable to apply the present invention to a multi-hole tube which is formed in dimensions of a width from 12 mm to 25 mm, a height from 1.2 mm to 3.0 mm and thicknesses of partition walls from 0.15 mm to 0.3 mm and has fluid paths of a number from 15 to 30.

Although the invention has been described with reference to the embodiments, it should be appreciated that the invention is not limited solely to these specific forms but various modifications may be made to the forms described above or the invention may be embodied in other forms, without departing from the scope of appended claims.

Figure 9A:
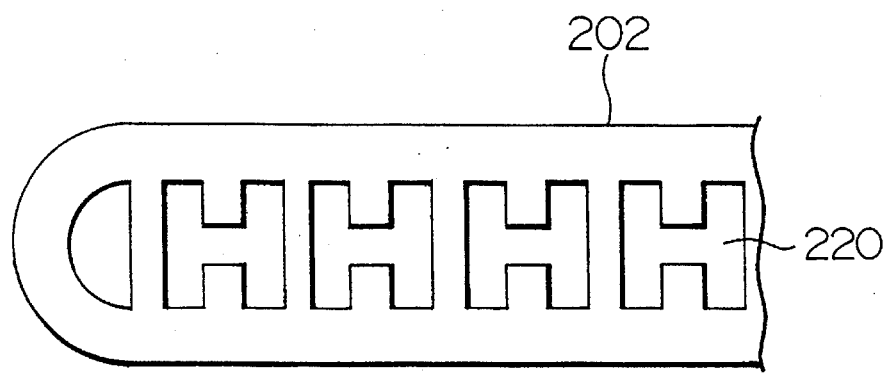
FIGS. 9A, 9B and 9C are fragmentary end views showing modifications of the flat tube shown in FIG. 1, respectively.
Figure 9B:
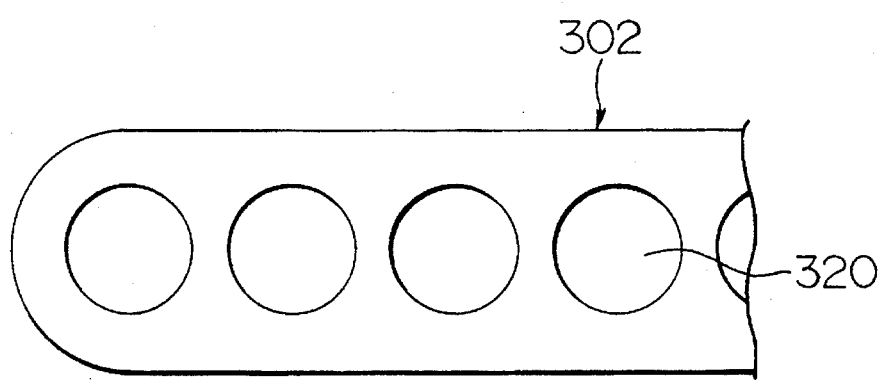
Figure 9C:
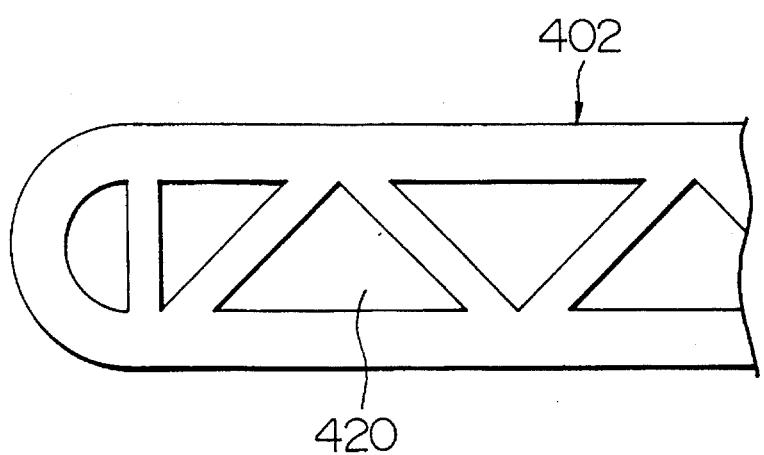
Figure 10:
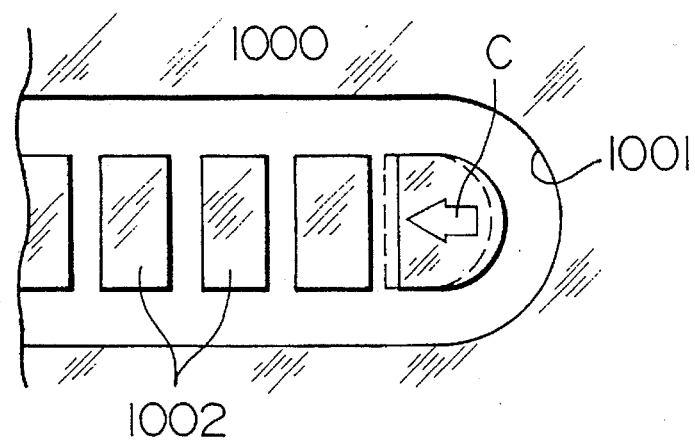

For example, although the refrigerant paths of the first and second embodiments described above have a rectangular cross section, the invention is applicable to a multi-hole tube having refrigerant paths of a different cross section. A flat tube 202 may have refrigerant paths 220 of an H-shaped cross section as shown in FIG. 9A, a flat tube 302 may have refrigerant paths 320 of a circular cross section as shown in FIG. 9B, or a flat tube 402 may have refrigerant paths 420 of a triangular cross section as shown in FIG. 9C. Further, the invention is applicable to a multi-hole tube which has opposite ends shaped in another configuration than a semicircle, for instance, in a rectangular configuration.

Incidentally, as a material for making the multi-hole tube of the invention, pure aluminum specified with a number on the order of one thousand in the standard by the Aluminum Association of America, such as AA 1100 and AA 1050, or an aluminum alloy specified with a number on the three thousand order in the AA standard, such as A 3003, can be used. The aluminum material used for the multi-hole tubes of the embodiments is AA 3003.

What is claimed is:

1. A flat multi-hole tube having a cross section which is formed by two side portions confronting each other, two connection portions respectively connecting the two side portions to each other at opposite ends thereof, and at least four partition walls respectively interconnecting the two side portions to define therein spaces serving as a plurality of fluid paths, wherein thicknesses of adjacent partition walls and path widths of said fluid paths are varied in a direction of width of the multi-hole tube and are set to satisfy at least one of following conditions:

(a) when said thicknesses of said partition walls are represented from respective ends thereof in the width direction toward inside by $t_a$, $t_b$, $t_c$, $t_d$, . . . , said thicknesses are in a relation of $t_a > t_b$; and (b) when said path widths of said fluid paths are represented from respective ends thereof in the width direction toward inside by $w_a$, $w_b$, $w_c$, $w_d$, $w_e$, . . . , said path widths are in a relation of $w_b > w_c$.

2. The tube according to claim 1, wherein when a thickness of each of said connection portions in the width direction is represented by T, said thicknesses T and $t_a$ are set to be in a relation of $T > t_a$.

3. The tube according to claim 2, wherein said path widths of said fluid paths are set to have a further relation of $w_a > w_b$.

4. The tube according to claim 3, wherein said thicknesses of said partition walls are set to be in a further relation of $t_b > t_c > t_d$ . . . .

5. The tube according to claim 4, wherein said path widths of said fluid paths are set to be in a further relation of $w_c > w_d > w_e$ . . . .

6. The tube according to claim 1, wherein the multi-hole tube is formed in dimensions of a width from 12 mm to 25 mm, a height from 1.2 mm to 3.0 mm and the thicknesses of said partition walls from 0.15 mm to 0.3 mm to have the fluid paths of a number from 15 to 30.

7. The tube according to claim 5, wherein the multi-hole tube is formed in dimensions of a width from 12 mm to 25 mm, a height from 1.2 mm to 3.0 mm and the thicknesses of said partition walls form 0.15 mm to 0.3 mm to have the fluid paths of a number from 15 to 30.

8. The tube according to claim 6, wherein the multi-hole tube is made of aluminum.

* * * * *